US012627174B2

(12) United States Patent
Li et al.

(10) Patent No.: US 12,627,174 B2
(45) Date of Patent: May 12, 2026

(54) METHOD OF IRREGULAR TILED TRANSMITTING ARRAYS FOR REALIZING MULTI-ANGLE RECEIVING MICROWAVE WIRELESS POWER TRANSMISSION

(71) Applicant: Xidian University, Xi'an (CN)

(72) Inventors: Xun Li, Xi'an (CN); Chunhuai Xue, Xi'an (CN); Baoyan Duan, Xi'an (CN); Yiqun Zhang, Xi'an (CN); Guangda Chen, Xi'an (CN)

(73) Assignee: Xidian University, Xi'an (CN)

( * ) Notice: Subject to any disclaimer, the term of this patent is extended or adjusted under 35 U.S.C. 154(b) by 0 days.

(21) Appl. No.: 19/281,738

(22) Filed: Jul. 27, 2025

(65) Prior Publication Data

US 2026/0106493 A1     Apr. 16, 2026

(30) Foreign Application Priority Data

Oct. 12, 2024     (CN) .......................... 202411423195.0

(51) Int. Cl.
*H02J 50/27*          (2016.01)
*H02J 50/40*          (2016.01)
*H04B 7/06*           (2006.01)

(52) U.S. Cl.
CPC ............ *H02J 50/27* (2016.02); *H02J 50/402* (2020.01); *H04B 7/06956* (2023.05)

(58) Field of Classification Search
CPC .......... H02J 50/20; H02J 50/27; H02J 50/402; H04B 7/06956
See application file for complete search history.

(56) References Cited

U.S. PATENT DOCUMENTS 8,558,661 B2 * 10/2013 Zeine ...................... H02J 50/23
340/5.1

OTHER PUBLICATIONS

CNIPA, Notification of First Office Action for CN202411423195.0, Mar. 4, 2025.
Xi'an University of Electronic Science and Technology (Applicant), Replacement claims (allowed) of CN202411423195.0, Mar. 11, 2025.
CNIPA, Notification to grant patent right for invention in CN202411423195.0, Mar. 26, 2025.

* cited by examiner

*Primary Examiner* — Carlos Amaya
(74) *Attorney, Agent, or Firm* — Hemisphere Law, PLLC

(57)          ABSTRACT

A design method of irregular tiled transmitting arrays for realizing multi-angle receiving microwave wireless power transmission relates to the technical field of antenna design, and includes: performing combinatorial arrangement according to irregularity degrees of 4-element polyomino subarrays of different types to obtain a filling set including multiple secondary subarray sets, obtaining a feasible filling solution set of a designed array based on the filling set, constructing a BCE optimization model for multi-receiving-area application scenarios of microwave wireless power transmission, and obtaining the optimal subarray filling solution scheme of the designed array based on the BCE optimization model and the feasible filling solution sets. The design method has characteristics of low cost and high safety, and is applicable to multiple receiving areas, showing broad prospects in engineering applications.

7 Claims, 7 Drawing Sheets

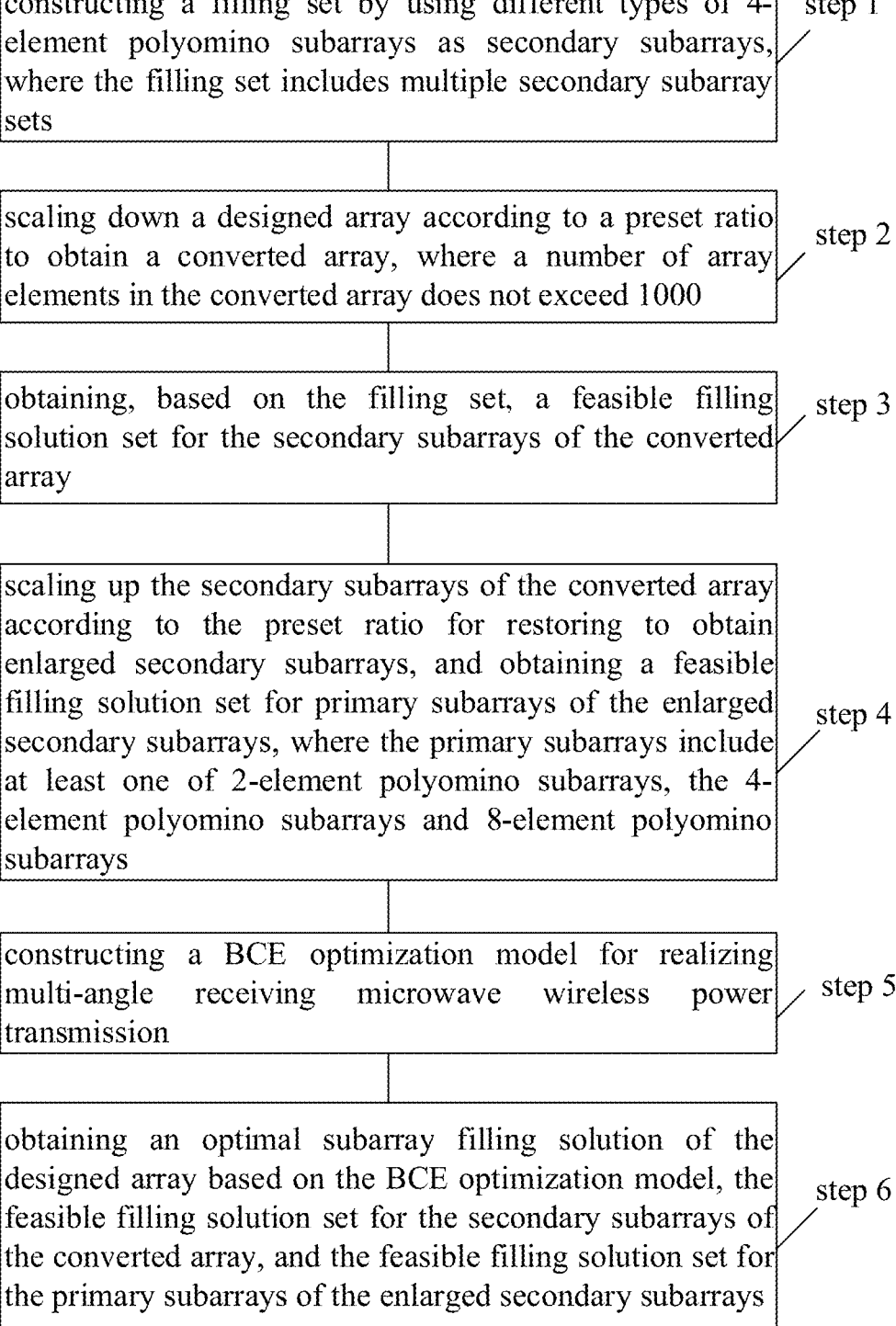

constructing a filling set by using different types of 4-element polyomino subarrays as secondary subarrays, where the filling set includes multiple secondary subarray sets — step 1 scaling down a designed array according to a preset ratio to obtain a converted array, where a number of array elements in the converted array does not exceed 1000 — step 2 obtaining, based on the filling set, a feasible filling solution set for the secondary subarrays of the converted array — step 3 scaling up the secondary subarrays of the converted array according to the preset ratio for restoring to obtain enlarged secondary subarrays, and obtaining a feasible filling solution set for primary subarrays of the enlarged secondary subarrays, where the primary subarrays include at least one of 2-element polyomino subarrays, the 4-element polyomino subarrays and 8-element polyomino subarrays — step 4 constructing a BCE optimization model for realizing multi-angle receiving microwave wireless power transmission — step 5 obtaining an optimal subarray filling solution of the designed array based on the BCE optimization model, the feasible filling solution set for the secondary subarrays of the converted array, and the feasible filling solution set for the primary subarrays of the enlarged secondary subarrays — step 6

FIG. 1 primary
subarray secondary
subarray

METHOD OF IRREGULAR TILED TRANSMITTING ARRAYS FOR REALIZING MULTI-ANGLE RECEIVING MICROWAVE WIRELESS POWER TRANSMISSION

CROSS-REFERENCE TO RELATED APPLICATION

This application claims priority to Chinese Patent Application No. 202411423195.0, filed Oct. 12, 2024, which is herein incorporated by reference in its entirety.

TECHNICAL FIELD

The disclosure relates to the technical field of antenna design, and more particularly to a design method of irregular tiled transmitting arrays for realizing multi-angle receiving microwave wireless power transmission.

BACKGROUND

In recent years, microwave wireless power transmission has attracted widespread attention. Microwave wireless power transmission systems can supply power for specific devices, such as drones, electric vehicles, and solar power satellites. Beam collection efficiency (BCE) is a commonly used indicator for evaluating performance of the microwave wireless power transmission systems. The BCE is defined as a ratio of the energy radiated onto the aperture of the rectifying rectenna to a total transmitted energy from a transmitting antenna. Many studies on antenna arrays mainly focus on optimizing array excitations to achieve high BCE. To reduce costs, arrays are generally in the form of subarrays. However, uniform arrays with same shape subarrays, due to the periodic arrangement of subarrays, can produce grating lobes during scanning, which greatly affects the safety and efficiency of the power transmission systems. Irregular tiled subarray phased arrays, which eliminate the grating lobes by disrupting phase centers, have attracted widespread attention.

For irregular subarray division techniques, most scholars mainly focus on the maximum sidelobe level. Research in the microwave wireless power transmission field is relatively limited and mainly includes the following design ideas: (1) only considering the BCE when the transmitting antenna is directly facing the receiving antenna, first obtaining the reference excitation that maximizes the BCE, and then using excitation matching techniques to match the subarray feeding excitations to maximize the BCE when facing directly; and (2) considering the BCE of various receiving areas within a certain scanning range, first dividing the array based on generalized BCE convex optimization, followed by optimizing design of the feeding excitations on this dividing basis.

Although the above designs provide methods for irregular subarray division and feeding excitation, each subarray has different feeding excitations, requiring many types of active channels, which is costly and still difficult to accept in engineering practice.

SUMMARY

In order to solve the above problems in the related art, the disclosure provides a design method of irregular tiled transmitting arrays for realizing multi-angle receiving microwave wireless power transmission. The disclosure has following technical solutions to solve the technical problems.

The disclosure provides the design method of the irregular tiled transmitting arrays for realizing multi-angle receiving microwave wireless power transmission, including:

step 1, constructing a filling set by using different types of 4-element polyomino subarrays as secondary subarrays, where the filling set includes multiple secondary subarray sets;

step 2, scaling down a designed array according to a preset ratio to obtain a converted array, where a number of array elements in the converted array does not exceed 1000;

step 3, obtaining, based on the filling set, a feasible filling solution set for the secondary subarrays of the converted array;

step 4, scaling up the secondary subarrays of the converted array according to the preset ratio for restoring to obtain enlarged secondary subarrays, and obtaining a feasible filling solution set for primary subarrays of the enlarged secondary subarrays, where the primary subarrays include at least one of 2-element polyomino subarrays, the 4-element polyomino subarrays and 8-element polyomino subarrays;

step 5, constructing a BCE optimization model for realizing multi-angle receiving microwave wireless power transmission; and step 6, obtaining, based on the BCE optimization model, the feasible filling solution set for the secondary subarrays of the converted array, and the feasible filling solution set for the primary subarrays of the enlarged secondary subarrays, an optimal subarray filling solution of the designed array.

In an embodiment, the optimal subarray filling solution of the designed array is an irregular subarray arrangement scheme for the transmitting antenna, and the design method further includes: manufacturing the transmitting antenna based on the irregular subarray arrangement scheme, and applying the transmitting antenna in scenarios such as drones, electric vehicles, and solar power satellites.

In an embodiment, step 1 includes:

step 1.1, determining irregularity degrees for the different types of the 4-element polyomino subarrays;

step 1.2, sorting the different types of the 4-element polyomino subarrays in a descending order of the irregularity degrees to obtain sorted 4-element polyomino subarrays; and step 1.3, arranging combinatorially the sorted 4-element polyomino subarrays to obtain the multiple secondary subarray sets, where the multiple secondary subarray sets form the filling set.

In an embodiment, step 3 includes:

step 3.1, obtaining, based on a preset maximum feasible filling solution number for the secondary subarrays in a partition, a value range of partitions for the converted array;

step 3.2, selecting a partition number from the value range according to engineering requirements, and partitioning the converted array by using a k-means clustering method based on the partition number to obtain a partition result; and step 3.3, calculating, based on the filling set and the partition result, feasible filling solutions for the secondary subarrays of each of the partitions by using a dancing links X (DLX) algorithm, where the feasible filling solutions for the secondary subarrays of the partitions form the feasible filling solution set for the secondary subarrays of the converted array.

In an embodiment, step 4 includes:

step 4.1, scaling up the secondary subarrays of each of the partitions according to the preset ratio for restoring to obtain the enlarged secondary subarrays of each of the partitions; and step 4.2, calculating, according to selected primary subarrays of each of the partitions, feasible filling solutions for the primary subarrays of the enlarged secondary subarrays of each of the partitions by using the DLX algorithm, where the feasible filling solutions for the primary subarrays of the enlarged secondary subarrays of the partitions form the feasible filling solution set for the primary subarrays of the enlarged secondary subarrays.

In an embodiment, step 5 includes:

step 5.1, obtaining a radiation array factor of the designed array;

step 5.2, determining, based on the radiation array factor of the designed array and shapes of microwave receiving areas, a BCE for the realizing multi-angle receiving microwave wireless power transmission of each of the microwave receiving areas and a maximum radiation level outside each of the microwave receiving areas; and step 5.3, constructing, based on the BCE for the realizing multi-angle receiving microwave wireless power transmission of each of the microwave receiving areas, the BCE optimization model for realizing multi-angle receiving microwave wireless power transmission.

In an embodiment, the radiation array factor of the designed array is expressed as follows:

$$AF(u, v) = \sum_{n=1}^{N} \sum_{m=1}^{M} \omega_m \delta_{c_n m} e^{jk(x_n u + y_n v)}$$

where AF (u, v) represents the radiation array factor of the designed array; $u = \sin\theta\cos\varphi$, $v = \sin\theta\sin\varphi$, where $(\theta, \varphi)$ represents an angular coordinate of an antenna coordinate system, $\varphi$ represents an azimuth angle, and $\theta$ represents an elevation angle; N represents a number of array elements in the designed array; M represents a number of subarrays of the designed array; $\omega_m$ represents a complex excitation of an m-th subarray of the subarrays of the designed array; $c_n$ represents a subarray to which an n-th array element of the array elements in the designed array belongs; when the n-th array element belongs to the m-th subarray, $\delta_{c_n m} = 1$, and when the n-th array element does not belong to the m-th subarray, $\delta_{c_n m} = 0$; $k = 2\pi/\lambda$, where $\lambda$ represents an operating wavelength; $(x_n, y_n)$ represents a position coordinate of the n-th array element; and j represents an imaginary unit.

In an embodiment, the BCE for the realizing multi-angle receiving microwave wireless power transmission of each of the microwave receiving areas and the maximum radiation level outside each of the microwave receiving areas are expressed as follows:

$$BCE = \frac{P_\Psi}{P_\Omega} = \frac{\int_\Psi |AF(u, v)|^2 du dv}{\int_\Omega |AF(u, v)|^2 du dv}$$

-continued $$PRL(dB) = 20\, lg\left(\frac{\max_{u,v \notin \Psi} |AF(u, v)|}{\max_{u,v} |AF(u, v)|}\right)$$

where BCE represents the beam collection efficiency of the microwave receiving area; PRL(dB) represents the maximum radiation level outside the microwave receiving area; $P_\Psi$ represents a radiation power in the microwave receiving area; $P_\Omega$ represents a radiation power in an entire visible area;

$$\Omega = \{(u, v) \mid (u^2 + v^2) \leq 1\};$$

when the microwave receiving area is rectangular, $$\Psi = \{(u, v) \mid |u - u_s| \leq u_0, |v - v_s| \leq v_0\};$$

when the microwave receiving area is circular, $$\Psi = \{(u, v) \mid ((u - u_s)^2 + (v - v_s)^2) \leq r_0^2\};$$

where $u_0$ represents a length of the microwave receiving area being rectangular, $v_0$ represents a width of the microwave receiving area being rectangular, $r_0$ represents a radius of the microwave receiving area being circular, $u_s = \sin\theta_s\cos\varphi_s$, $v_s = \sin\theta_s\sin\varphi_s$, $\varphi_s$ represents a scanning azimuth angle, and $\theta_s$ represents a scanning elevation angle.

In an embodiment, the BCE optimization model is a first optimization model or a second optimization model, the first optimization model is expressed as follows:

$$\text{Min. } f(x_{opt}) = \frac{1}{\sum_{p=1}^{P-1} BCE_p(\vec{x}_{opt})} + \sum_{p=1}^{P-1}\sum_{j=1}^{i-1} |BCE_i(\vec{x}_{opt}) - BCE_j(\vec{x}_{opt}), \text{ and}$$

the second optimization model is expressed as follows:

$$\text{Min. } f(x_{opt}) = \frac{1}{\sum_{p=1}^{P-1} BCE_p(\vec{x}_{opt})}$$

where Min. represents minimization, $\vec{x}_{opt}$ represents the optimal subarray filling solution of the designed array, and P represents a number of the microwave receiving areas.

Compared with the related art, the disclosure may have following benefit effects.

The design method of the irregular tiled transmitting arrays for realizing multi-angle receiving microwave wireless power transmission of the disclosure includes: performing combinatorial arrangement according to the irregularity degrees of the 4-element polyomino subarrays of different types to obtain the filling set including the multiple secondary subarray sets, obtaining the feasible filling solution set of the designed array based on the filling set, constructing the BCE optimization model for multi-receiving-area application scenarios of microwave wireless power transmission, and obtaining the optimal subarray filling solution scheme of the designed array based on the BCE optimization model and the feasible filling solution sets. The design method has characteristics of low cost and high safety, and is applicable to multiple receiving areas, showing broad prospects in engineering applications.

The above description is only an overview of technical solutions of the disclosure. In order to more clearly understand technical means of the disclosure for implementation according to the content of the specification, and in order to make the above and other objectives, features, and advantages of the disclosure more apparent and understandable, exemplary embodiments are given below in detail with the accompanying drawings.

BRIEF DESCRIPTION OF DRAWINGS

FIG. 1 illustrates a flowchart of a design method of irregular tiled transmitting arrays for realizing multi-angle receiving microwave wireless power transmission according to an embodiment of the disclosure.

DETAILED DESCRIPTION OF EMBODIMENTS

Figure 2:
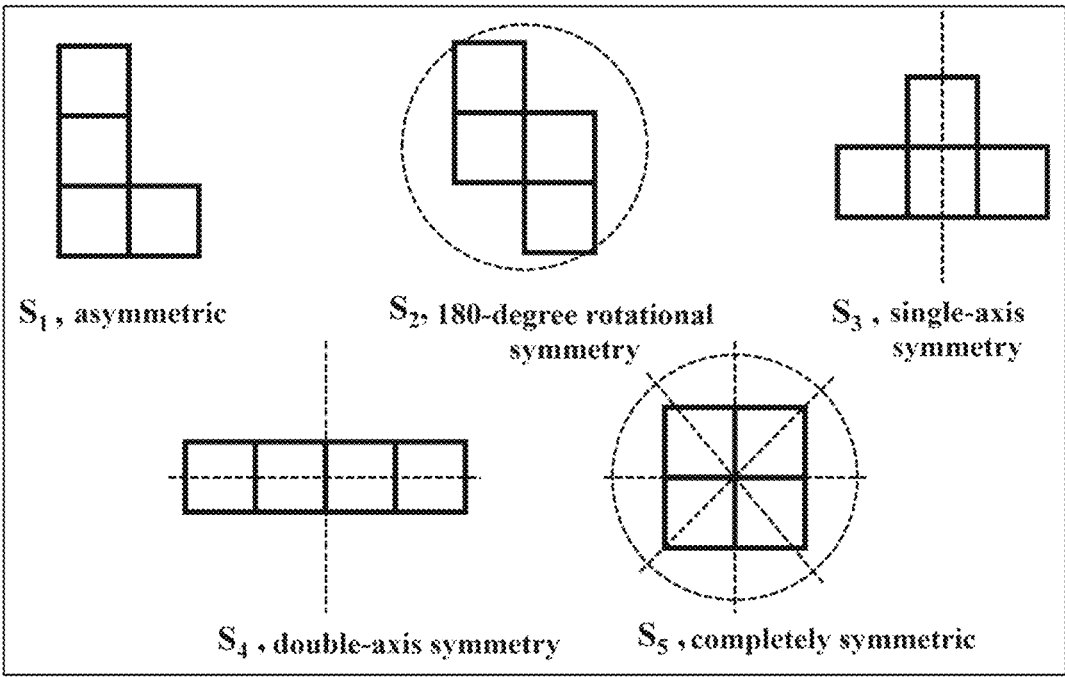
FIG. 2 illustrates a schematic diagram of irregularity degrees of different types of 4-element polyomino subarrays according to the embodiment of the disclosure.

In order to further illustrate the technical means and effects adopted by the disclosure to achieve the predetermined objectives, a detailed description of an irregular subarray design method for multi-angle-receiving microwave wireless power transmission antennas according to the disclosure is provided below, in conjunction with the accompanying drawings and specific embodiments.

The aforementioned and other technical contents, features, and effects related to the disclosure can be clearly presented in the detailed description of embodiments in conjunction with the accompanying drawings. Through the explanation of the embodiments, a deeper and more specific understanding of the technical means and effects adopted by the disclosure to achieve the predetermined objectives can be obtained. However, the accompanying drawings are only for reference and explanation, and are not intended to limit the technical solutions of the disclosure.

An embodiment of the disclosure provides a design method of irregular tiled transmitting arrays for realizing multi-angle receiving microwave wireless power transmission, referring to FIG. 1. FIG. 1 illustrates a flowchart of the design method of the irregular tiled transmitting arrays for realizing multi-angle receiving microwave wireless power transmission according to the embodiment of the disclosure. As shown in FIG. 1, the design method of the irregular tiled transmitting arrays for realizing multi-angle receiving microwave wireless power transmission includes:

step 1, constructing a filling set by using different types of 4-element polyomino subarrays as secondary subarrays, where the filling set includes multiple secondary subarray sets;

step 2, scaling down a designed array according to a preset ratio to obtain a converted array, where a number of array elements in the converted array does not exceed 1000;

step 3, obtaining, based on the filling set, a feasible filling solution set for the secondary subarrays of the converted array;

step 4, scaling up the secondary subarrays of the converted array according to the preset ratio for restoring to obtain enlarged secondary subarrays, and obtaining a feasible filling solution set for primary subarrays of the enlarged secondary subarrays, where the primary subarrays include at least one of 2-element polyomino subarrays, the 4-element polyomino subarrays and 8-element polyomino subarrays;

step 5, constructing a BCE optimization model for realizing multi-angle receiving microwave wireless power transmission; and step 6, obtaining, based on the BCE optimization model, the feasible filling solution set for the secondary subarrays of the converted array, and the feasible filling solution set for the primary subarrays of the enlarged secondary subarrays, an optimal subarray filling solution of the designed array.

The design method of the irregular tiled transmitting arrays for realizing multi-angle receiving microwave wireless power transmission of the embodiment of the disclosure includes: performing combinatorial arrangement according to the irregularity degrees of the 4-element polyomino subarrays of different types to obtain the filling set including the multiple secondary subarray sets, obtaining the feasible filling solution set of the designed array based on the filling set, constructing the BCE optimization model for multi-receiving-area application scenarios of microwave wireless power transmission, and obtaining the optimal subarray filling solution scheme of the designed array based on the BCE optimization model and the feasible filling solution sets. The design method has characteristics of low cost and high safety, and is applicable to multiple receiving areas, showing broad prospects in engineering applications.

The design method of the irregular tiled transmitting arrays for realizing multi-angle receiving microwave wireless power transmission of the embodiment of the disclosure is further explained below.

In an embodiment, step 1 includes following steps 1.1-1.3.

Step 1.1, irregularity degrees for the different types of the 4-element polyomino subarrays are determined.

The 4-element polyomino subarrays have five different types with different irregularity degrees, and the irregularity degrees are closely related to the array pattern performance. In the embodiment, the five different types of 4-element polyomino subarrays serve as the secondary subarrays.

Step 1.2, the different types of the 4-element polyomino subarrays are sorted in a descending order of the irregularity degrees to obtain sorted 4-element polyomino subarrays.

In the embodiment, the five different types of 4-element polyomino subarrays are sorted according to the irregularity degrees with symmetry serving as the criterion to obtain the sorted 4-element polyomino subarrays denoted as $S_1$, $S_2$, $S_3$, $S_4$ and $S_5$ respectively according to the descending order of the irregularity degrees. A schematic diagram of the irregularity degrees of the different types of the 4-element polyomino subarrays is shown in FIG. 2.

Step 1.3, the sorted 4-element polyomino subarrays are combinatorially arranged to obtain the multiple secondary subarray sets, where the multiple secondary subarray sets form the filling set.

In the embodiment, the five different types of sorted 4-element polyomino subarrays are combinatorially arranged in combinations of one, two, three, four, and five sequentially, to obtain 31 secondary subarray sets $A_1$, $A_2$, to $A_{30}$, $A_{31}$. The 31 secondary subarray sets together form the filling set $A=\{A_1, A_2, \ldots, A_{30}, A_{31}\}$. In the embodiment, the filling set can be expressed as follows:

$$A = \{A_1, A_2, \ldots, A_{30}, A_{31}\}$$

$$= \{[S_1], [S_2], \ldots,$$

$$[S_1, S_2], [S_1, S_3], \ldots,$$

$$[S_1, S_2, S_3], [S_1, S_2, S_4], \ldots,$$

$$[S_1, S_2, S_3, S_4], [S_1, S_2, S_3, S_5], \ldots,$$

$$[S_1, S_2, S_3, S_4, S_5]\}$$

In an embodiment, in step 2, for a designed array with a number of array elements not exceeding 1000, the preset ratio can be 1, i.e., the designed array is not scaled down and converted; and the preset ratio can be set to a value not being 1, i.e., the designed array is further scaled down and converted.

Exemplarily, a 24×24 design array can be scaled down according to a preset ratio B=2 to obtain a 12×12 converted array; also, the 24×24 design array may not be scaled down, i.e., with a preset ratio B=1, to obtain a converted array remaining at 24×24.

In an embodiment, step 3 may include following steps 3.1-3.3.

Step 3.1, based on a preset maximum feasible filling solution number for the secondary subarrays in a partition, a value range of partitions for the converted array is obtained.

Specifically, in the embodiment, a partition number for the designed array is selected. Based on the selected partition number, a k-means clustering method is used to partition the design array into partitions. Then, a DLX algorithm is utilized to calculate feasible filling solutions for the secondary subarrays of each of partitions. Due to limitations in computer memory, it is necessary to limit the maximum feasible filling solution number for the secondary subarrays of each partition. In the embodiment, the maximum feasible filling solution number for the secondary subarrays in the partition is set to K. Under the constraint of the maximum feasible filling solution number K for the secondary subarrays in the partition, a minimum partition number $L_{min}$ and a maximum partition number $L_{max}$ of the converted array can be obtained according to calculation models as follows:

$$\text{Find } A^* = \left[ A^1, A^2, \ldots, A^L \right]$$

$$\text{Min. } L$$

$$\text{s.t. } A^{i'} \subseteq A, i = 1, 2, \ldots L$$

-continued $$K^{i'} \leq K, i' = 1, 2, \ldots L$$

$$\text{Find } A^* = \left[ A^1, A^2, \ldots, A^L \right]$$

$$\text{Min. } -L$$

$$\text{s.t. } A^{i'} \subseteq A, i' = 1, 2, \ldots L$$

$$0 \leq K^{i'} \leq K, i' = 1, 2, \ldots L$$

$$L \geq L_{min}$$

where $A^{i'}$ represents secondary subarray set of an i'-th partition of the partitions, $K^{i'}$ represents a number of the feasible filling solutions for the secondary subarrays of the i'-th partition, and L represents the partition number.

Step 3.2, the partition number is selected from the value range according to engineering requirements, and the converted array is partitioned by using the k-means clustering method based on the partition number to obtain a partition result.

In the embodiment, the partition number L selected from the partition value range according to the engineering requirements should meet $L_{min} \leq L \leq L_{max}$.

In the embodiment, the converted array is partitioned by using the k-means clustering method, i.e., by minimizing the difference between the BCE of the subarrays and the reference BCE, a problem of subarray partitioning can be simplified to a problem of excitation matching. Given the partition number, the k-means clustering method can be used to obtain the optimal partitioning scheme and amplitude excitation distribution to maximum BCE of primary receiving region, serving as the partition result for the converted array.

Step 3.3, based on the filling set and the partition result, feasible filling solutions for the secondary subarrays of each of the partitions are calculated by using the DLX algorithm, where the feasible filling solutions for the secondary subarrays of the partitions form the feasible filling solution set for the secondary subarrays of the converted array.

In the embodiment, a process of using the DLX algorithm to calculate the feasible filling solutions for the secondary subarrays of each of the partitions is as follows.

On the basis of determining the filling set $A^*=\{A^1, A^2, \ldots, A^L\}$, a dictionary matrix Z is constructed to represent all possible distributions of the secondary subarrays of the secondary subarray sets within a filling area. Each row of the dictionary matrix Z represents a secondary subarray distribution within the filling area, and each column of the dictionary matrix Z represents a cell of the filling area. When Z(a,b)=1, an a-th cell of the filling area belongs to a b-th secondary subarray distribution; otherwise, the a-th cell of the filling area does not belong to the b-th secondary subarray distribution. Under the description of the dictionary matrix Z, the exact cover problem is expressed as selecting multiple rows whose sum is exactly an all-ones vector. Then, the DLX algorithm is used to calculate selection vectors X, i.e., feasible solutions. The DLX algorithm can calculate all the selection vectors X which meet $X^T \cdot Z = (1, 1, \ldots 1)^T$, where T represents matrix transpose.

It should be specifically noted that when the filling area of a partition cannot be completely filled, i.e., when the DLX algorithm outputs no solution, relaxed array elements are introduced to the array of this partition, and the above filling process is repeated until a feasible solution is output.

In the embodiment, the feasible filling solution set for the secondary subarrays of the converted array can be expressed as:

$$X1 = [X_1^*, \ X_2^*, \ \dots \ X_L^*],$$

where L represents the partition number.

In an embodiment, step 4 may include following steps 4.1-4.2.

Step 4.1, the secondary subarrays of each of the partitions are scaled up according to the preset ratio for restoring to obtain the enlarged secondary subarrays of each of the partitions.

Step 4.2, according to selected primary subarrays of each of the partitions, feasible filling solutions for the primary subarrays of the enlarged secondary subarrays of each of the partitions are calculated by using the DLX algorithm, where the feasible filling solutions for the primary subarrays of the enlarged secondary subarrays of the partitions form the feasible filling solution set for the primary subarrays of the enlarged secondary subarrays.

In the embodiment, the enlarged secondary subarrays can be regarded as a filling area, and thus based on the primary subarrays, the DLX algorithm can be used again to obtain the feasible filling solutions for the primary subarrays of the enlarged secondary subarrays. The feasible filling solution set for the primary subarrays of the enlarged secondary subarrays can be represented as $$X2 = \left[ X_{L+1}^*, X_{L+2}^*, \dots, X_{L+Q}^* \right],$$

where L represents the partition number, and Q represents a total number of types of secondary subarrays filled in all the partitions.

It should be noted that, the primary subarrays selected to fill the enlarged secondary subarrays of each partition can be at least one of 2-element polyomino subarrays, the 4-element polyomino subarrays and 8-element polyomino subarrays, without limitations here.

Figure 3:
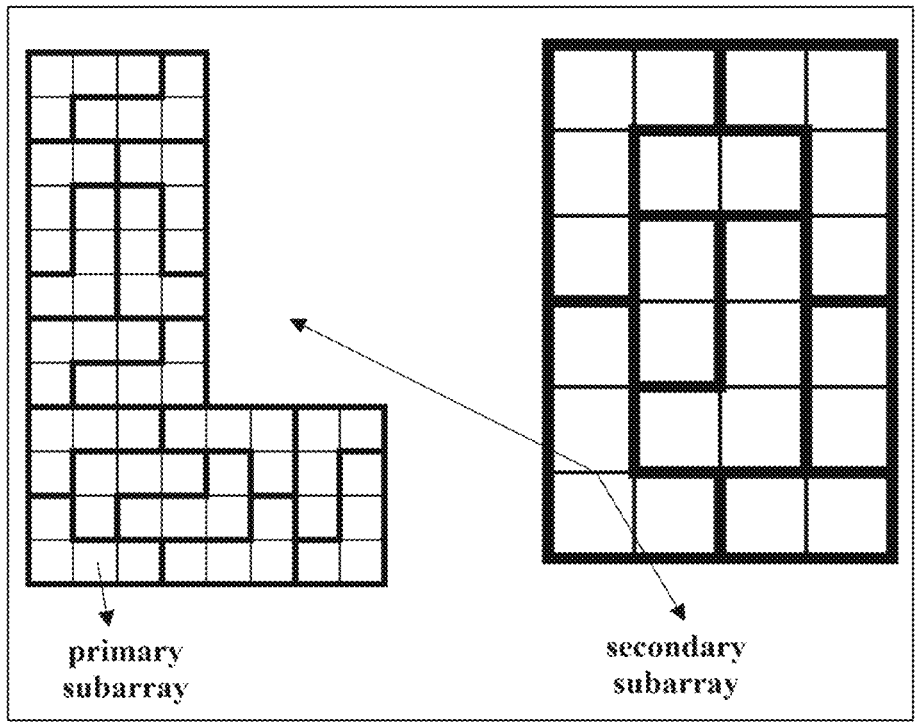
FIG. 3 illustrates a schematic diagram of filling of secondary subarrays and primary subarrays according to the embodiment of the disclosure.

Referring to FIG. 3, FIG. 3 illustrates a schematic diagram of filling of the secondary subarrays and the primary subarrays according to the embodiment of the disclosure. As shown in FIG. 3, the secondary subarrays, which include the five types as shown in FIG. 2, are scaled up and restored according to the preset ratio to obtain the enlarged secondary subarrays correspondingly. The enlarged secondary subarrays are filled with the primary subarrays.

It should be noted that for each partition of the converted array, the enlarged secondary subarrays obtained by scaling up according to the preset ratio are relatively regular. Therefore, the primary subarrays used to fill the enlarged secondary subarrays are not limited to the 4-element polyomino subarrays, and can also be 2-element polyomino subarrays or 8-element polyomino subarrays.

It is worth noting that, when the preset ratio is 1, meaning the converted array and the design array have the same size, the enlarged secondary subarrays coincide with the secondary subarrays. In this case, the primary subarrays used to fill the enlarged secondary subarrays are the secondary subarrays themselves.

In an embodiment, step 5 includes following steps 5.1-5.3.

Step 5.1, a radiation array factor of the designed array is obtained.

Figure 4:
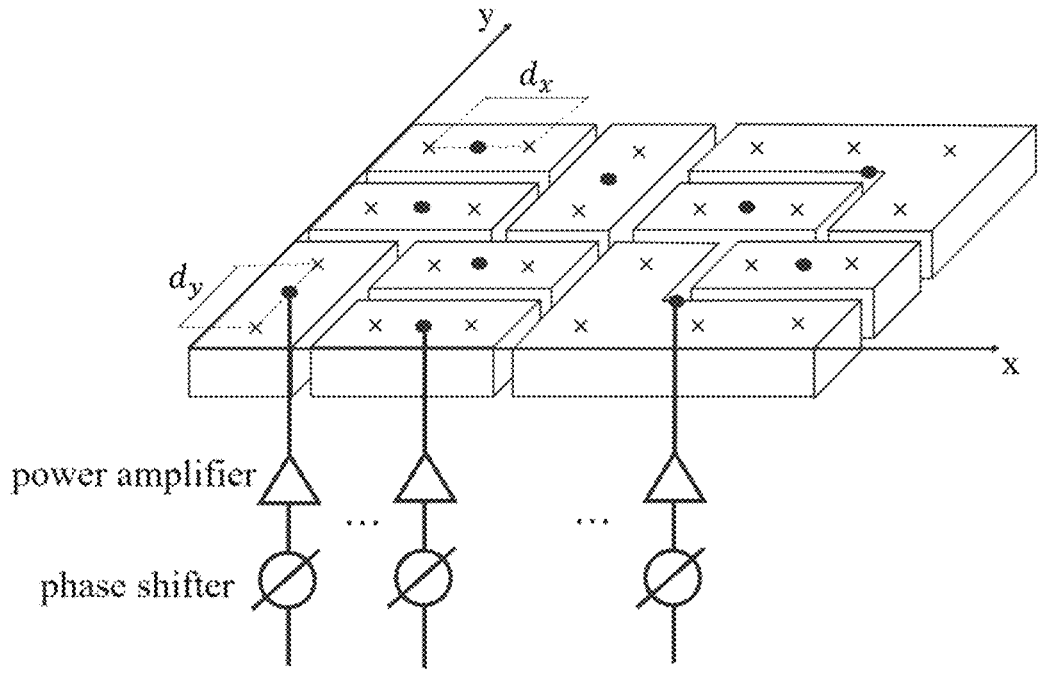
FIG. 4 illustrates a schematic diagram of an array arrangement of irregular subarrays according to the embodiment of the disclosure.

Referring to FIG. 4, FIG. 4 illustrates a schematic diagram of an array arrangement of irregular subarrays according to the embodiment of the disclosure. As shown in FIG. 4, for a planar phased array that is exactly covered by M subarrays, the radiation array factor is expressed as follows:

$$AF(u, v) = \sum_{n-1}^{N} \sum_{m=1}^{M} \omega_m \delta_{c_n m} e^{jk(x_n u + y_n v)}$$

where AF (u, v) represents the radiation array factor of the designed array; u=sin θ cos φ, v=sin θ sin φ, where (θ, φ) represents an angular coordinate of an antenna coordinate system, φ represents an azimuth angle, and θ represents an elevation angle; N represents a number of array elements in the designed array; M represents a number of subarrays of the designed array; $\omega_m$ represents a complex excitation of an m-th subarray of the subarrays of the designed array; $c_n$ represents a subarray to which an n-th array element of the array elements in the designed array belongs; when the n-th array element belongs to the m-th subarray, i.e., $c_n$=m, $\delta_{c_n}$=1, and when the n-th array element does not belong to the m-th subarray, $\delta_{c_n m}$=0; k=2π/λ, where λ represents an operating wavelength; $(x_n, y_n)$ represents, a position coordinate of the n-th array element; and j represents an imaginary unit.

In the embodiment, for the irregular subarray filling of the array, different filling methods have different $\omega_m$ and $\delta_{c_n m}$, for $\delta_{c_n m}$ of a reference array, $\omega_m$ can be calculated according to a formula as follows:

$$\omega_m = \frac{\sum_{n=1}^{N} \omega_n^{ref} \delta_{c_n m}}{\sum_{n=1}^{N} \delta_{c_n m}}$$

where $$\omega_n^{ref}$$

represent a complex excitation of an n-th array element of the reference array; the amplitude distribution of $$\omega_n^{ref}$$

is determined during the partitioning with the k-means clustering method, and the phase distribution of $$\omega_n^{ref}$$

is determined by $\delta_{c_n m}$. Once the array filling method is determined, $\delta_{c_n m}$ representing the filling structure and phase distribution of the array is consequently determined.

Step 5.2, based on the radiation array factor of the designed array and shapes of microwave receiving areas, a BCE for the realizing multi-angle receiving microwave wireless power transmission of each of the microwave receiving areas and a maximum radiation level outside each of the microwave receiving areas are determined.

In the embodiment, the BCE for the realizing multi-angle receiving microwave wireless power transmission of each of the microwave receiving areas and the maximum radiation level outside each of the microwave receiving areas are expressed as follows:

$$BCE = \frac{P_\Psi}{P_\Omega} = \frac{\int\limits_{\Psi} |AF(u, v)|^2 dudv}{\int\limits_{\Omega} |AF(u, v)|^2 dudv}$$

$$PRL(dB) = 20 \log\left(\frac{\max_{u, v \notin \Psi} |AF(u, v)|}{\max_{u, v} |AF(u, v)|}\right)$$

where BCE represents the beam collection efficiency of the microwave receiving area; PRL(dB) represents the maximum radiation level outside the microwave receiving area; $P_\Psi$ represents a radiation power in the microwave receiving area; $P_\Omega$ represents a radiation power in an entire visible area;

$$\Omega = \{(u, v)|(u^2 + v^2) \le 1\};$$

when the microwave receiving area is rectangular, $$\Psi = \{(u, v)||u - u_s| \le u_0, |v - v_s| \le v_0\};$$

when the microwave receiving area is circular, $$\Psi = \{(u, v)|((u - u_s)^2 + (v - v_s)^2) \le r_0^2\};$$

where $u_0$ represents a length of the microwave receiving area being rectangular, $v_0$ represents a width of the microwave receiving area being rectangular, $r_0$ represents a radius of the microwave receiving area being circular, $u_s = \sin\theta_s \cos\varphi_s$, $v_s = \sin\theta_s \sin\varphi_s$, $\varphi_s$ represents a scanning azimuth angle, and $\theta_s$ represents a scanning elevation angle.

Step 5.3, based on the BCE for the realizing multi-angle receiving microwave wireless power transmission of each of the microwave receiving areas, the BCE optimization model for realizing multi-angle receiving microwave wireless power transmission is constructed.

Figure 5:
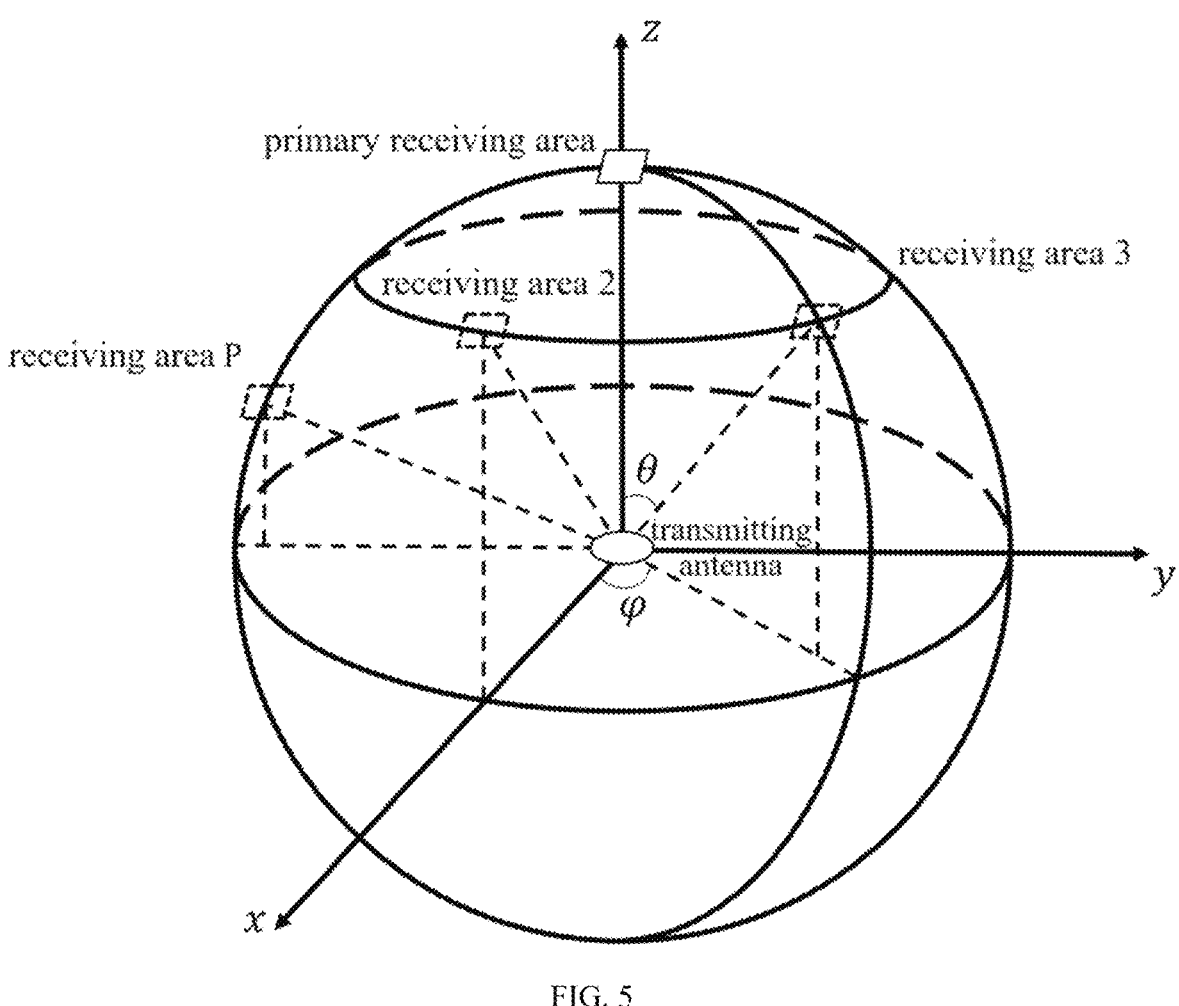
FIG. 5 illustrates a schematic diagram of multi-angle receiving microwave wireless power transmission according to the embodiment of the disclosure.

Referring to FIG. 5, FIG. 5 illustrates a schematic diagram of multi-angle receiving microwave wireless power transmission according to the embodiment of the disclosure. As shown in FIG. 5, in a microwave wireless power transmission system, there is typically one transmitting antenna and multiple receiving areas at different angles. In P receiving areas, an area directly facing the transmitting and receiving antenna is a primary receiving area, while the other P–1 receiving areas are referred to as secondary receiving areas. After partitioning the converted array based on the selected partition number and filling each partition, the obtained feasible filling solution set for the secondary subarrays ensure the maximum BCE for the primary receiving area, and thus the constructed BCE optimization model for realizing multi-angle receiving microwave wireless power transmission only needs to ensure that the BCE of each of the P–1 secondary receiving areas is sufficiently large, or ensure a maximum total sum of BCE.

In the embodiment, the BCE optimization model can be a first optimization model, which ensures that the BCE of each of the P–1 secondary receiving areas is sufficiently large, or a second optimization model, which ensures the maximum total sum of BCE.

The first optimization model is expressed as follows:

$$\text{Min. } f(\vec{x}_{opt}) = \frac{1}{\sum\limits_{p=1}^{P-1} BCE_p(\vec{x}_{opt})} + \sum_{i=2}^{P-1}\sum_{j=1}^{i-1} |BCE_i(\vec{x}_{opt}) - BCE_j(\vec{x}_{opt})|.$$

The second optimization model is expressed as follows:

$$\text{Min. } f(\vec{x}_{opt}) = \frac{1}{\sum\limits_{p=1}^{P-1} BCE_p(\vec{x}_{opt})}$$

where Min. represents minimization, $\vec{x}_{opt}$ represents the optimal subarray filling solution of the designed array, and P represents a number of the microwave receiving areas.

In an embodiment, a grey wolf optimizer (GWO) intelligent algorithm can be used to find the optimal subarray filling solution of the designed array from the feasible filling solution sets to achieve BCE optimization.

In the embodiment, when the preset ratio is 1, the GWO intelligent algorithm can be used to find the optimal subarray filling solution of the designed array $\vec{x}_{opt}$ from the feasible filling solution set $$X1 = [X_1^*, X_2^*, \dots X_L^*]$$

for the secondary subarrays of the converted array, and $\vec{x}_{opt}$ can be expressed as:

$$\vec{x}_{opt} = (x_1, x_2, \dots x_L)^T,$$

where $$x_l \in X_l^*, l = 1, 2, \dots L.$$

When the preset ratio is not 1, the optimization model has optimization variables including two parts, a part is the feasible filling solutions for the secondary subarrays of each partition of the converted array, and another part is the feasible filling solutions for the primary subarrays of the enlarged secondary subarrays. That is, the GWO intelligent algorithm can be used to find the optimal subarray filling solution of the designed array $\vec{x}_{opt}$ from the feasible filling solution set $$X1 = [X_1^*, X_2^*, \dots X_L^*]$$

for secondary subarrays of the converted array and the feasible filling solution set $$X2 = [X_{L+1}^*, X_{L+2}^*, \dots, X_{L+Q}^*]$$

for the primary subarrays of the enlarged secondary subarrays, and $\vec{x}_{opt}$ can be expressed as:

$$\vec{x}_{opt} = (x_1, x_2, \dots x_L, x_{L+1}, x_{L+2}, \dots, x_{L+Q})^T,$$

where $$x_l \in X_l^*, l = 1, 2, \dots L, x_{L+q} \in X_{L+q}^*, q = 1, \dots, Q.$$

Furthermore, the design method of the irregular tiled transmitting arrays for realizing multi-angle receiving microwave wireless power transmission and its effects are explained through specific simulation experiments.

1. Simulation parameters are as follows.

The antenna, i.e., the design array, is square-shaped with an operating frequency of 5.8 gigahertz (GHz), a side length of 101, an element spacing of half-wavelength, and an array element number of 20×20. The size of the receiving area is $$\Psi = \{(u, v) \| u - u_s | \le u_0, |v - v_s| \le v_0\}, u_0 = v_0 = 0.15.$$

The angle of the primary receiving area is φ=0°, θ=0°. The angles of the secondary receiving areas are: φ=45°, θ=5°, φ=150°, θ=10°, φ=0°, θ=15°, φ=270°, θ=20°.

2. The simulation content and result are as follows.

First, the preset ratio is set to 1, i.e., no conversion. To ensure the BCE for the primary receiving area is the largest, the reference BCE excitation distribution is taken as the maximum BCE amplitude excitation obtained by the generalized eigenvalue method.

Secondly, the maximum acceptable number of feasible solutions is set to 1000000, and the minimum partition number and the maximum partition number are calculated as $L_{min}=4$, and $L_{max}=6$ respectively.

Then, the partition schemes and the filling solution sets with the partition number of 4, 5, and 6 are respectively solved, and are substituted into the BCE optimization model for separate solutions, with the results shown in Table 1.

TABLE 1

| Angle/partition number | | L = 4 | L = 5 | L = 6 |
|---|---|---|---|---|
| φ = 0°, θ = 0° | BCE(%) | 95.28 | 96.66 | 98.33 |
| | PRL(dB) | −28.0765 | −26.3943 | −25.7809 |
| φ = 45°, θ = 5° | BCE(%) | 90.22 | 92.12 | 93.20 |
| | PRL(dB) | −24.1365 | −24.8171 | −23.1435 |

TABLE 1-continued

| Angle/partition number | | L = 4 | L = 5 | L = 6 |
|---|---|---|---|---|
| φ = 150°, θ = 10° | BCE(%) | 81.54 | 83.79 | 85.35 |
| | PRL(dB) | −21.3533 | −22.0448 | −21.9993 |
| φ = 0°, θ = 15° | BCE(%) | 63.71 | 68, 92 | 66.14 |
| | PRL(dB) | −15.8138 | −17.9099 | −16.5550 |
| φ = 270°, θ = 20° | BCE(%) | 56.31 | 61.65 | 60.69 |
| | PRL(dB) | −15.6475 | −12.9692 | −17.1706 |
| Average value | BCE(%) | 77.412 | 80.628 | 80.742 |
| | PRL(dB) | −21.0055 | −20.8271 | −20.9299 |

Except for L=5, when φ=270°, θ=20°, the angle PRL is −12.9692 dB, greater than −15 dB, and the maximum level outside all other areas are below −15 dB, which fully complies with the safety requirements. Except for L=4, when φ=270°, θ=20°, the angle BCE is 56.31%, less than 60%, and BCE of all other areas are greater than 60%. The BCE average values for the partition numbers L of 4, 5, and 6 are 77.412%, 80.628%, and 80.742% respectively, with the number of source channel types only 4, 5, and 6 respectively. With the increase in the number of source channel types, the performance also increases. From the results, it can be found that the design method of the disclosure can effectively design a high BCE, high safety, and low-cost transmission antenna array arrangement.

Figure 6:
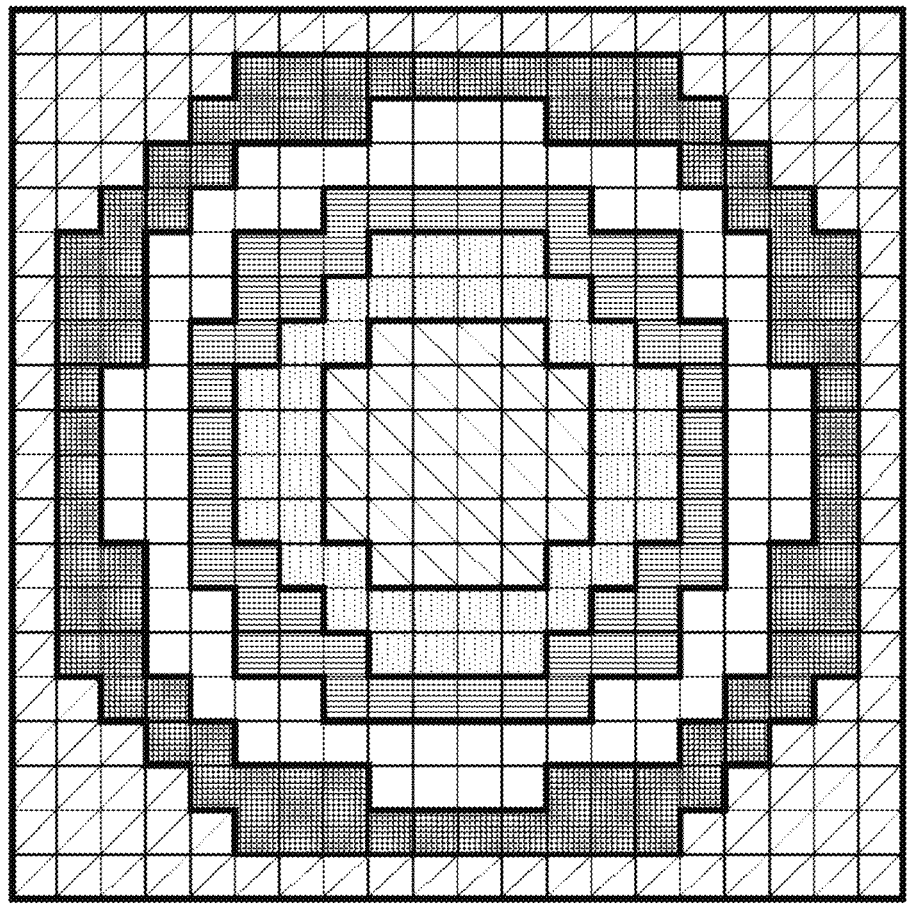
FIG. 6 illustrates a schematic diagram of a partition result according to the embodiment of the disclosure.
Figure 7:
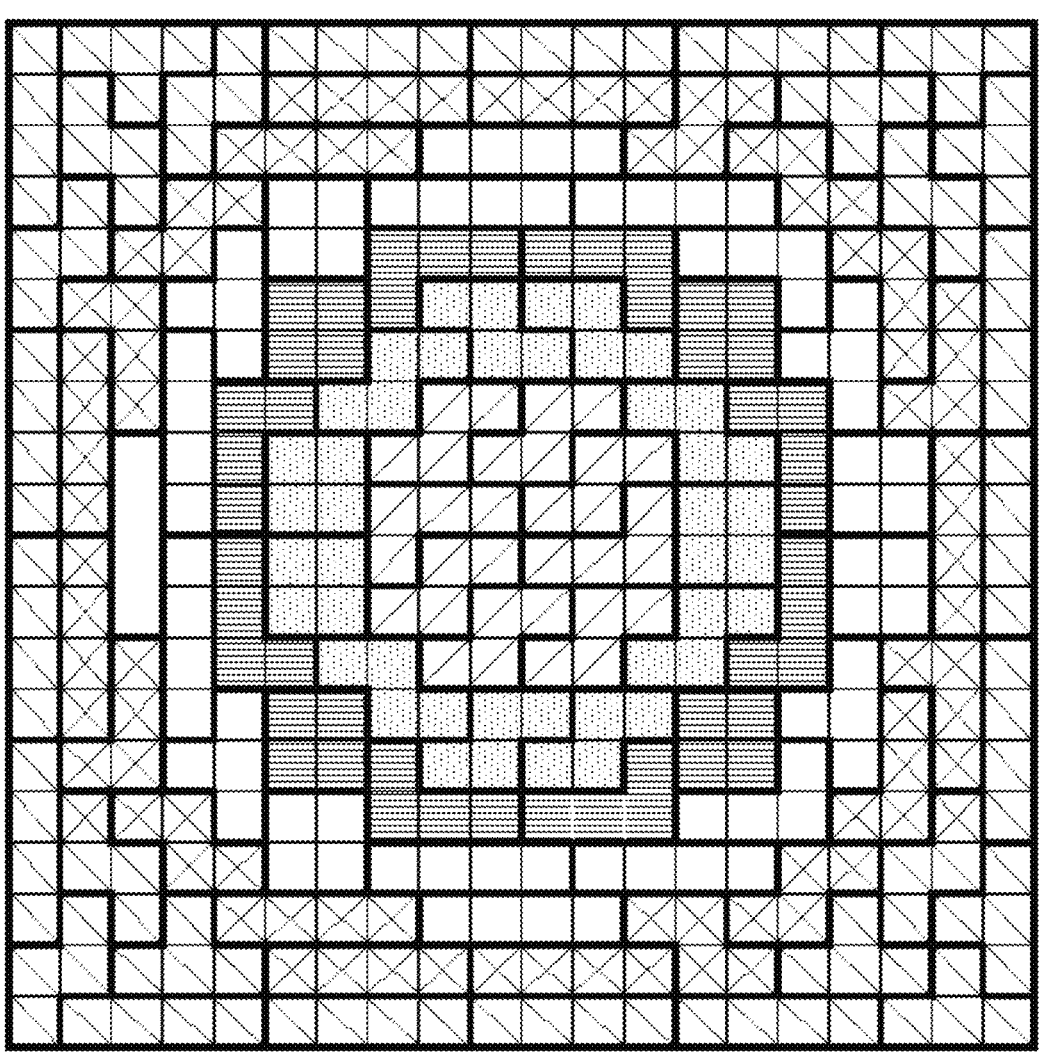
FIG. 7 illustrates a schematic diagram of an optimal subarray filling solution of a designed array according to the embodiment of the disclosure.

For a partitioning scheme of the array with the partition number L=6, please refer to FIG. 6 which illustrates a schematic diagram of a partition result according to the embodiment of the disclosure. The amplitude excitations corresponding to this partition division are [0.9203, 0.7199, 0.5297, 0.3425, 0.1838] respectively. For an optimal subarray filling scheme of the array with the partition number L=6, please refer to FIG. 7 which illustrates a schematic diagram of an optimal subarray filling solution of a designed array according to the embodiment of the disclosure.

It should be noted that, relational terms herein such as "first" and "second" are only used to distinguish one entity or operation from another, and do not necessarily require or imply any actual relationship or order between these entities or operations. Moreover, the terms "including", "comprising", or any other variation are intended to encompass non-exclusive inclusion, such that an item or device that includes a series of elements not only includes those elements, but also includes other elements that are not explicitly listed. Without further limitations, the element limited by the statement "including one . . . " does not exclude the existence of other identical elements in the item or equipment that includes the element in question. Words like "connection" or "communication" are not limited to physical or mechanical connections, but can include electrical connections, whether direct or indirect. The directional or positional relationships indicated by "up", "down", "left", "right", etc. are based on the directional or positional relationships shown in the accompanying drawings, only for the convenience of describing the disclosure and simplifying the description, and do not indicate or imply that the device or component referred to must have a specific orientation, be constructed and operated in a specific orientation, and therefore cannot be understood as limiting the disclosure.

The above content is a further detailed explanation of the disclosure based on specific illustrated embodiments, and it cannot be assumed that the specific implementation of the disclosure is limited to these explanations. For those skilled in the art, several simple deductions or substitutions can be made without departing from the concept of the disclosure, which should be considered as within the scope of protection of the disclosure.

15

16

What is claimed is:

1. A design method of irregular tiled transmitting arrays for realizing multi-angle receiving microwave wireless power transmission, the design method comprising:

step 1, constructing a filling set by using different types of 4-element polyomino subarrays as secondary subarrays, wherein the filling set comprises a plurality of secondary subarray sets;

step 2, scaling down a designed array according to a preset ratio to obtain a converted array, wherein a number of array elements in the converted array does not exceed 1000;

step 3, obtaining, based on the filling set, a feasible filling solution set for the secondary subarrays of the converted array;

step 4, scaling up the secondary subarrays of the converted array according to the preset ratio for restoring to obtain enlarged secondary subarrays, and obtaining a feasible filling solution set for primary subarrays of the enlarged secondary subarrays, wherein the primary subarrays comprise at least one of 2-element polyomino subarrays, the 4-element polyomino subarrays and 8-element polyomino subarrays;

step 5, constructing a beam collection efficiency (BCE) optimization model for realizing multi-angle receiving microwave wireless power transmission, comprising:

step 5.1, obtaining a radiation array factor of the designed array;

step 5.2, determining, based on the radiation array factor of the designed array and shapes of microwave receiving areas, a BCE for the realizing multi-angle receiving microwave wireless power transmission of each of the microwave receiving areas and a maximum radiation level outside each of the microwave receiving areas; and step 5.3, constructing, based on the BCE for the realizing multi-angle receiving microwave wireless power transmission of each of the microwave receiving areas, the BCE optimization model for realizing multi-angle receiving microwave wireless power transmission; and step 6, obtaining, based on the BCE optimization model for realizing multi-angle receiving microwave wireless power transmission, the feasible filling solution set for the secondary subarrays of the converted array, and the feasible filling solution set for the primary subarrays of the enlarged secondary subarrays, an optimal subarray filling solution of the designed array.

2. The design method of the irregular tiled transmitting arrays for realizing multi-angle receiving microwave wireless power transmission as claimed in claim 1, wherein step 1 comprises:

step 1.1, determining irregularity degrees for the different types of the 4-element polyomino subarrays;

step 1.2, sorting the different types of the 4-element polyomino subarrays in a descending order of the irregularity degrees to obtain sorted 4-element polyomino subarrays; and step 1.3, arranging combinatorially the sorted 4-element polyomino subarrays to obtain the plurality of secondary subarray sets, wherein the plurality of secondary subarray sets form the filling set.

3. The design method of the irregular tiled transmitting arrays for realizing multi-angle receiving microwave wireless power transmission as claimed in claim 1, wherein step 3 comprises:

step 3.1, obtaining, based on a preset maximum feasible filling solution number for the secondary subarrays in a partition, a value range of partitions for the converted array;

step 3.2, selecting a partition number from the value range according to engineering requirements, and partitioning the converted array by using a k-means clustering method based on the partition number to obtain a partition result; and step 3.3, calculating, based on the filling set and the partition result, feasible filling solutions for the secondary subarrays of each of the partitions by using a dancing links X (DLX) algorithm, wherein the feasible filling solutions for the secondary subarrays of the partitions form the feasible filling solution set for the secondary subarrays of the converted array.

4. The design method of the irregular tiled transmitting arrays for realizing multi-angle receiving microwave wireless power transmission as claimed in claim 3, wherein step 4 comprises:

step 4.1, scaling up the secondary subarrays of each of the partitions according to the preset ratio for restoring to obtain the enlarged secondary subarrays of each of the partitions; and step 4.2, calculating, according to selected primary subarrays of each of the partitions, feasible filling solutions for the primary subarrays of the enlarged secondary subarrays of each of the partitions by using the DLX algorithm, wherein the feasible filling solutions for the primary subarrays of the enlarged secondary subarrays of the partitions form the feasible filling solution set for the primary subarrays of the enlarged secondary subarrays.

5. The design method of the irregular tiled transmitting arrays for realizing multi-angle receiving microwave wireless power transmission as claimed in claim 1, wherein the radiation array factor of the designed array is expressed as follows:

$$AF(u, v) = \sum_{n=1}^{N} \sum_{m=1}^{M} \omega_m \delta_{c_n m} e^{jk(x_n u + y_n v)}$$

where AF (u, v) represents the radiation array factor of the designed array; u=sin θ cos φ, v=sin θ sin φ, where (θ, φ) represents an angular coordinate of an antenna coordinate system, φ represents an azimuth angle, and θ represents an elevation angle; N represents a number of array elements in the designed array; M represents a number of subarrays of the designed array; $\Phi_m$ represents a complex excitation of an m-th subarray of the subarrays of the designed array; $c_n$ represents a subarray to which an n-th array element of the array elements in the designed array belongs; when the n-th array element belongs to the m-th subarray, $\delta_{c_n m}=1$, and when the n-th array element does not belong to the m-th subarray, $\delta_{c_n m}=0$; k=2π/λ, where λ represents an operating wavelength; $(x_n, y_n)$ represents a position coordinate of the n-th array element; and j represents an imaginary unit.

6. The design method of the irregular tiled transmitting arrays for realizing multi-angle receiving microwave wireless power transmission as claimed in claim 5, wherein the BCE for the realizing multi-angle receiving microwave wireless power transmission of each of the microwave receiving areas and the maximum radiation level outside each of the microwave receiving areas are expressed as follows:

$$BCE = \frac{P_\Psi}{P_\Omega} = \frac{\int\limits_\Psi |AF(u,v)|^2 dudv}{\int\limits_\Omega |AF(u,v)|^2 dudv}$$

$$PRL(\text{dB}) = 20 \lg\left(\frac{\max_{u,v\notin\Psi}|AF(u,v)|}{\max_{u,v}|AF(u,v)|}\right)$$

where BCE represents the beam collection efficiency of the microwave receiving area; PRL(dB) represents the maximum radiation level outside the microwave receiving area; $P_\Psi$ represents a radiation power in the microwave receiving area; $P_\Omega$ represents a radiation power in an entire visible area;

$$\Omega = \{(u,v) \mid (u^2+v^2) \le 1\};$$

when the microwave receiving area is rectangular, $$\Psi = \{(u,v)|u-u_s| \le u_0, |v-v_s| \le v_0\};$$

when the microwave receiving area is circular, $$\Psi = \{(u,v)|((u-u_s)^2 + (v-v_s)^2) \le r_0^2\};$$

where $u_0$ represents a length of the microwave receiving area being rectangular, $v_0$ represents a width of the microwave receiving area being rectangular, $r_0$ represents a radius of the microwave receiving area being circular, $u_s=\sin\theta_s\cos\varphi_s$, $v_s=\sin\theta_s\sin\varphi_s$, $\varphi_s$ represents a scanning azimuth angle, and $\theta_s$ represents a scanning elevation angle.

7. The design method of the irregular tiled transmitting arrays for realizing multi-angle receiving microwave wireless power transmission as claimed in claim 6, wherein the BCE optimization model is a first optimization model or a second optimization model, the first optimization model is expressed as follows:

$$\text{Min. } f(\vec{x}_{opt}) = \frac{1}{\sum\limits_{p=1}^{P-1} BCE_p(\vec{x}_{opt})}, \text{ and}$$
$$+ \sum\limits_{i=2}^{P-1}\sum\limits_{j=1}^{i-1} \left|BCE_i(\vec{x}_{opt}) - BCE_j(\vec{x}_{opt})\right|$$

the second optimization model is expressed as follows:

$$\text{Min. } f(\vec{x}_{opt}) = \frac{1}{\sum\limits_{p=1}^{P-1} BCE_p(\vec{x}_{opt})};$$

where Min. represents minimization, $\vec{x}_{opt}$ represents the optimal subarray filling solution of the designed array, and I' represents a number of the microwave receiving areas.

* * * * *